United States Patent [19]
Burkhart

[11] Patent Number: 5,261,386
[45] Date of Patent: Nov. 16, 1993

[54] PORTABLE CHARBROILER AND METHOD

[75] Inventor: William H. Burkhart, 225 Avalon Dr., Los Altos, Calif. 94022

[73] Assignee: William H. Burkhart, Los Altos, Calif.

[21] Appl. No.: 880,031

[22] Filed: May 8, 1992

[51] Int. Cl.$^5$ .............................................. F24B 3/00
[52] U.S. Cl. .................................... 126/25 R; 126/9 A
[58] Field of Search ............................ 126/25 R, 9 A

[56] References Cited

U.S. PATENT DOCUMENTS

| | | | |
|---|---|---|---|
| 2,690,171 | 9/1954 | Riedy | 126/25 |
| 2,918,051 | 12/1959 | Broman | 126/25 R |
| 3,375,816 | 4/1968 | Chestnut, Jr. | 126/25 |
| 3,378,002 | 4/1968 | Hink | 126/25 |
| 3,561,420 | 2/1971 | Paolella | 126/25 R |
| 3,606,066 | 9/1971 | Anderson | 220/9 R |
| 3,611,915 | 10/1971 | Glaser et al. | 126/25 R |
| 4,418,678 | 12/1983 | Erickson | 126/9 R |
| 4,434,781 | 3/1984 | Koziol | 126/25 R |
| 4,582,041 | 4/1986 | Erickson | 126/9 R |
| 4,635,612 | 1/1987 | Kakubari et al. | 126/25 R |
| 4,719,899 | 1/1988 | Burkhart | 126/163 R |
| 5,024,208 | 6/1991 | Hottenroth et al. | 126/25 R |

*Primary Examiner*—Carroll B. Dority
*Attorney, Agent, or Firm*—Victor R. Beckman

[57] ABSTRACT

A portable charbroiler (20) is shown that includes a bottom member (24) and sidewalls (26,26 and 28,28) of thermally insulating ceramic material that form an enclosure. Air inlet slots (30) are located along the bottom edges of the sidewalls, and an outlet port is provided at the upper end of the sidewalls. A grate (52) divides the enclosure into upper and lower chambers (54U and 54L), respectively. Lump carbonaceous fuel (58) is stacked on the grate (52), which stack of fuel is supported at all sides by the enclosure sidewalls (26,26 and 28,28). During combustion, feedback of heat to the fuel from the insulating enclosure bottom member and sidewalls provides for rapid high temperature combustion of the fuel in the 1800° F. to 2200° F. range and substantially smokeless combustion of CO gas and fat vapor. At such high temperatures, a large amount of radiant energy is emitted (FIG. 6) for rapid charbroiling of food (38) on grille (36) at the enclosure outlet. The charbroiler is self-cleaning at such high-temperature operation. For standby operation, a cover (48) of thermally insulating ceramic material is placed on the enclosure and is supported a short distance above the enclosure outlet on grille (36). The fuel (58) may be located in a net bag (70) made of ceramic fiber. The bag with coals and ashes is readily removed from the enclosure when finished charbroiling.

19 Claims, 6 Drawing Sheets

PORTABLE CHARBROILER AND METHOD

FIELD OF THE INVENTION

This invention relates generally to the art of charbroiling and the like, and more particularly to a portable charbroiler and method for burning lump carbonaceous fuel in the temperature range of 1800° F. to 2200° F. to provide high heat output power.

BACKGROUND OF THE INVENTION

It is generally accepted by people who have a serious interest in food taste and texture that meat should not be heated above about 170° F., at which temperature the meat is considered to be "well done". Many prefer heating to a much lower temperature on the order of, say 120° F., or 140° F. for "rare" or "medium" done meat. Higher temperatures cause protein foods to become dry and tough.

It is well known that by searing red meat over the coals of a hot anthracite furnace fire, a thin and tasty black char is produced on the surface of the meat while the interior remains rare, juicy and tender. Over such a hot fire, blackening on one side is achieved in about one minute, and such black-charred meat is judged by many to be noticeably superior to that of meat that is charred brown.

Barbecue grills yield two forms of energy, namely hot flue gases and radiant energy. Hot gases are inefficient for broiling because gases are poor conductors of heat. When a piece of meat, such as a steak, is placed above a fire in a conventional grill only a small fraction of the rising volume of hot gases contacts the meat surface. Most of the gases flow up and around the meat and their heat is lost to the atmosphere. Radiant energy emitted from the hot coals moves in straight lines, and most of the radiant energy rays which strike the meat surface are absorbed immediately and raise the temperature of the meat surface. With many prior art grills, flue gas temperatures are at about 1200° F. At such temperatures the total heat output provided by the combination of hot flue gases and radiant energy generally is less than 40 watts per square inch at the grill surface. As a result of such low heat output, charring of meat at the grill surface takes on the order of four or more minutes per side. In the relatively long time required to char the meat at such relatively low temperatures and heat output, much of the meat interior is heated to over the well-done condition and increases in toughness. The interior of meat prepared on such prior art grills is usually well-done before its exterior is charred dark brown or black.

SUMMARY AND OBJECTS OF THE INVENTION

An object of this invention is the provision of an improved portable charbroiler for burning lump carbonaceous fuel and method of operating the same which overcome or substantially alleviate deficiencies and shortcomings of prior art grills that operate at such low temperatures so as to primarily roast food.

An object of this invention is the provision of an improved portable charbroiler of the above-mentioned type that delivers substantially as much heat flux per square inch of grilling surface as a home anthracite furnace whereby the meat flavor obtained with anthracite furnaces may be duplicated using said charbroiler.

An object of this invention is the provision of an improved portable charbroiler of the above-mentioned type for burning lump carbonaceous fuel at a temperature in the range of 1800° F. to 2200° F. which provides high radiant energy heat output power in excess of 100 watts/in$^2$ for quickly charring food placed thereon with a minimum of roasting.

An object of this invention is the provision of an improved portable charbroiler of the above-mentioned type which operates at a high temperature so as to convert toxic carbon monoxide gas and polluting hydrocarbon smoke and fat vapors to carbon dioxide and water, just as automobile catalytic converters and incinerator plants operate at high temperatures to minimize pollution.

An object of this invention is the provision of an improved portable charbroiler of the above-mentioned type in which the fuel burns hot enough to ignite carbon monoxide and fat that drips onto the fire from meat along with resultant fat vapors and white smoke therefrom.

An object of this invention is the provision of an improved portable charbroiler of the above-mentioned type that produces substantially no toxic, odoriferous or taste modifying fumes while burning lump carbonaceous fuel.

An object of this invention is the provision of an improved portable charbroiler of the above-mentioned type that may be operated in a standby mode during which the rate of fuel consumption is reduced while maintaining the coals at a high temperature.

An object of this invention is the provision of an improved portable charbroiler of the above-mentioned type which includes means for handling the carbonaceous fuel while still burning which allows for the quick and easy removal of the burning fuel from the charbroiler for extinguishing the same when finished charbroiling.

In accordance with the present invention the charbroiler includes an enclosure, or container, of rigid refractory ceramic fiber (RCF) insulating material comprising a bottom wall and enclosed side walls supported on the bottom wall and having an outlet at the top thereof. Fibers commonly used in such rigid RCF insulating material include aluminum oxide and silicon oxide that are capable of withstanding temperatures up to 2400° F. RCF made of zirconium fibers allow higher temperature service but cost more. A grate is supported inside the enclosure near the bottom wall a parallel spaced distance therefrom, which grate divides the enclosure into upper and lower chambers. The upper chamber comprises a depot for lump carbonaceous fuel and the lower chamber comprises an air preheating manifold. Air inlet passage means are provided adjacent the bottom of the enclosure side walls for flow of ambient air into the air manifold. An outlet port is included at the top of the enclosure for natural convection of flue gases and emission of upwardly-directed radiant energy emitted from coals burning in the upper chamber. Lump carbonaceous fuel is loaded into the upper chamber through the top outlet to fill the depot, which fuel is supported at all sides by the enclosed side walls, and at the bottom by the grate. During combustion, heat feedback between the burning fuel and the inner surfaces of the thermally insulating container walls provide for rapid high temperature combustion of the fuel in a temperature range of between substantially 1800° F. and 2200° F. A food-supporting grill is located over the outlet at the top of the container, and meat or the like food supported thereon is rapidly charred black in about one minute per side. A cover which also is made of refractory ceramic fiber insulating material is provided for covering the container outlet and limiting the flow of gases of combustion through the outlet. The cover is placed on the container a short distance above the outlet port during periods when there is no demand for charred food, and when so placed reduces the rate of fuel consumption and heat output while maintaining the coals at a relatively high temperature so as to keep the fire hot and ready for use when next needed. With the plane cover spaced a short distance above the upper surface of the container the line of sight path for exit of radiant energy from the fuel bed to the space outside the charbroiler is minimized, heat feedback from the cover to the burning fuel is maximized, and the flow of hot gases from the outlet port is restricted. To facilitate removal of ashes from the charbroiler, a coarse mesh net bag, or sack, of ceramic fiber is provided for containing the lump carbonaceous fuel. The fuel may be loaded into the bag which, then, is lowered into the upper chamber of the charbroiler for burning of the fuel. When finished charbroiling, the bag containing hot coals and/or ashes may be lifted from the charbroiler and wet down with water to quickly extinguish the burning coals. It is a simple matter to dump the extinguished fuel and ashes from the bag, and to rinse the bag in preparation for reuse thereof.

The above and other objects and advantages will become apparent from the following description in view of the drawings. It here will be understood that the drawings are for purposes of illustration only and not by way of limitation.

BRIEF DESCRIPTION OF THE DRAWINGS

In the drawings, wherein like reference characters refer to the same parts in the several views.

Figure 1:
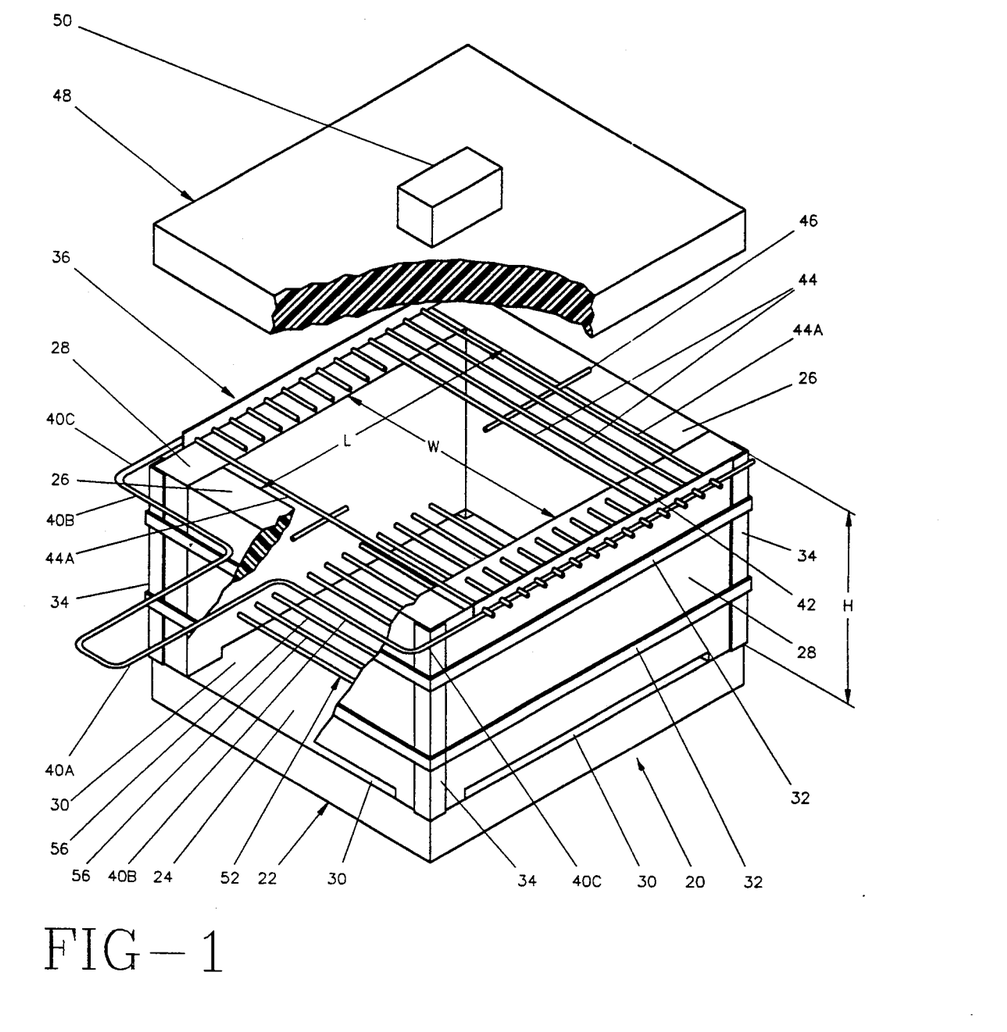
FIG. 1 is a perspective view of a charbroiler that embodies the present invention, with parts thereof being shown broken away for clarity.
Figure 2:
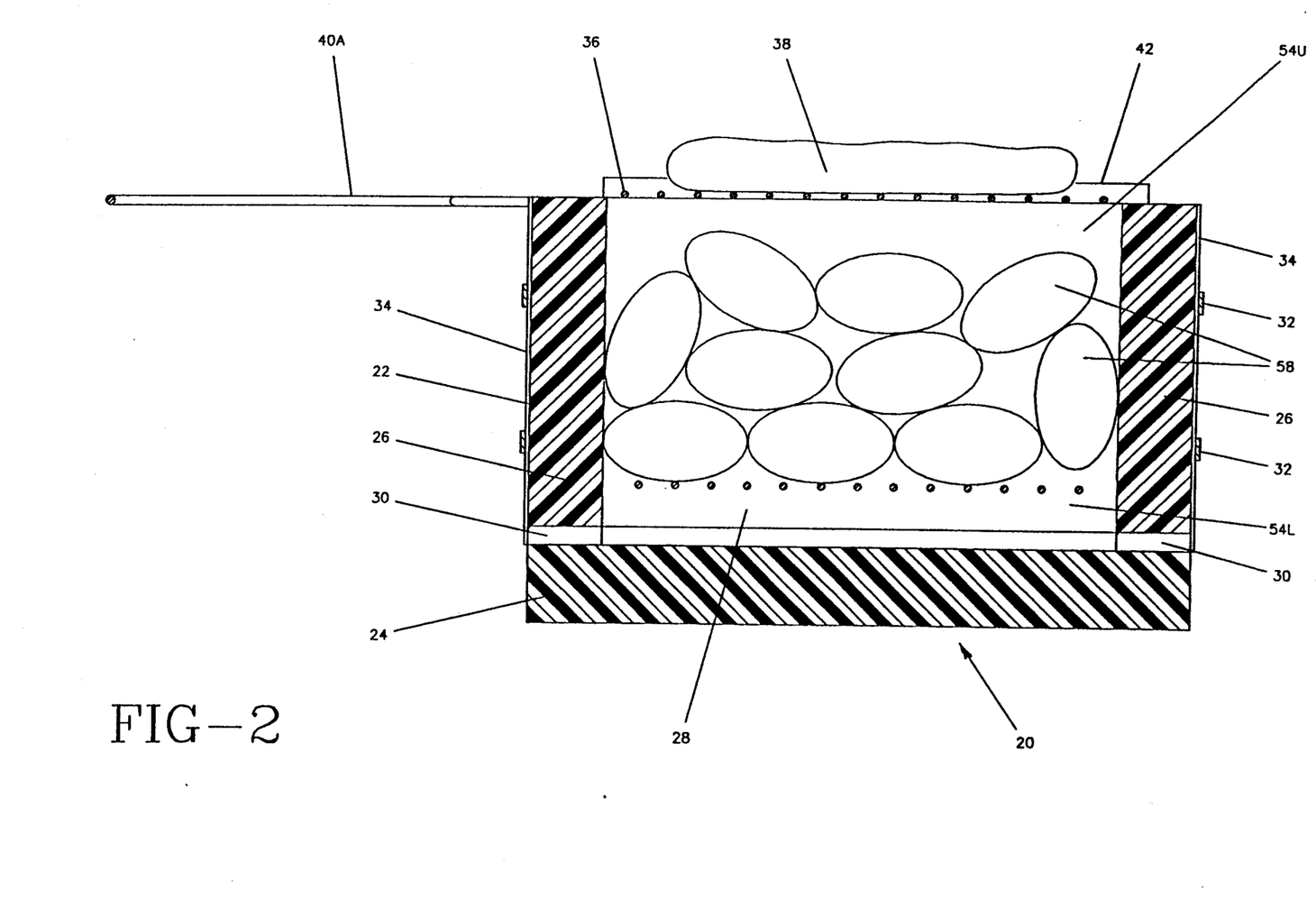
FIG. 2 is a vertical longitudinal sectional view of the charbroiler without the cover and filled with lump carbonaceous fuel.
Figure 3:
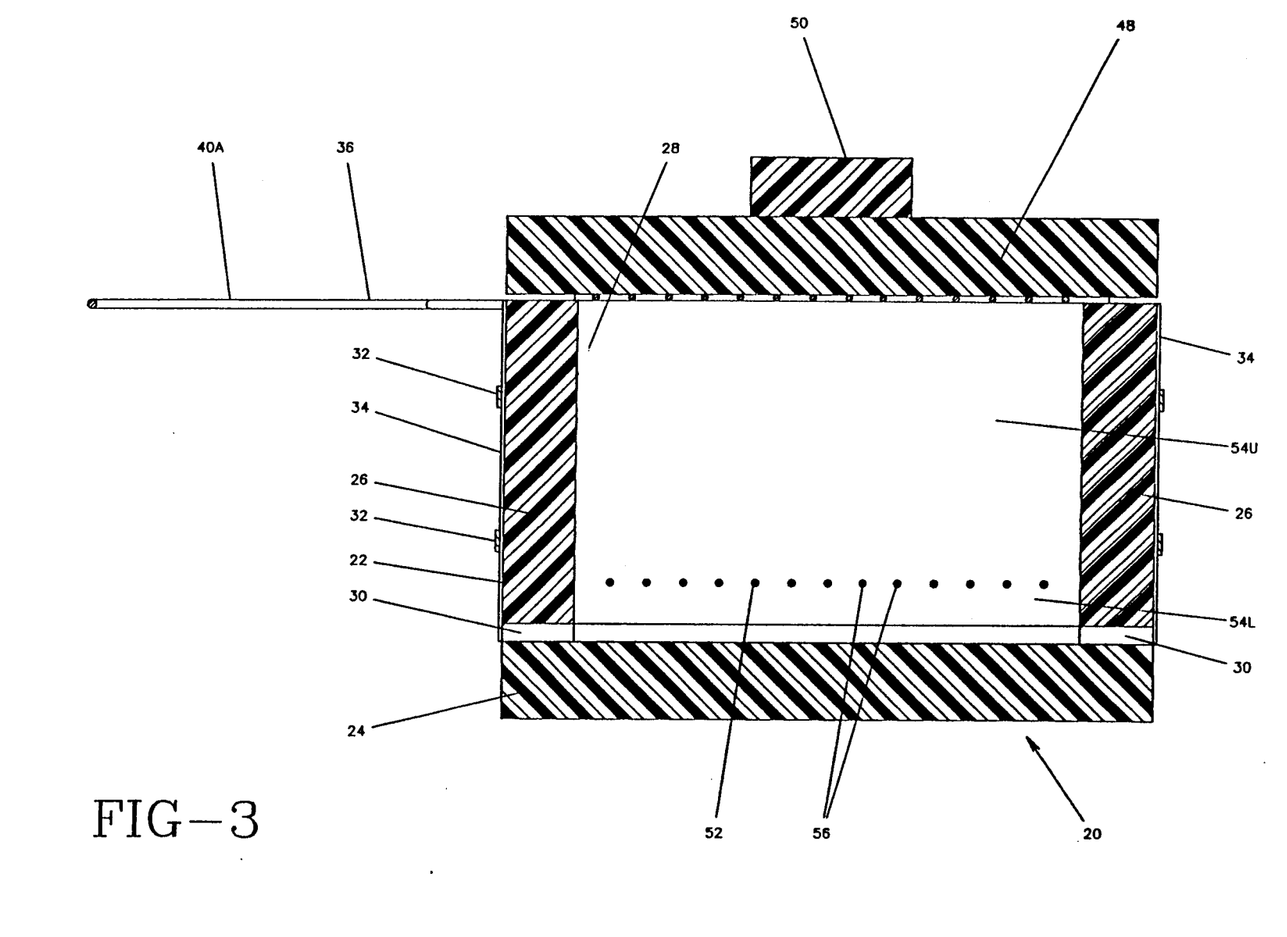
FIG. 3 is a view which is similar to that of FIG. 2 but showing the cover applied thereto.

Reference first is made to FIGS. 1-3 of the drawings wherein a charbroiler 20 is shown comprising a container, or enclosure, 22 that includes a substantially flat bottom, or base, member, 24 and first and second pairs of opposite walls 26,26 and 28,28 extending upwardly from the base member. As noted above, the walls and base member, together with a cover 48 described herein below, are made of rigid refractory ceramic fibre (RCF) boards having excellent insulating properties. The enclosure is provided with air inlet means 30 adjacent the bottom of the upright walls for the supply of air into the enclosure. Air inlet means 30 is in the form of an elongated horizontal slot formed between said bottom member 24 and the lower edge of the enclosure side walls 26 and 28. The enclosure also is provided with outlet means at the upper end thereof for exit of flue gases therefrom, which outlet is defined by the upper ends of the upwardly extending walls in the embodiment of FIGS. 1-3. The vertical side walls are held together by metal tension bands, or straps, 32 which encircle the walls. Vertical metallic angle members 34 are provided at the corners of the enclosure to prevent crushing of the walls by the tension bands, and stainless steel dowel pins, not shown, are inserted in aligned holes in abutting walls at the corners to maintain alignment of the walls. Obviously, other means for connecting the walls, including cementing thereof, may be used if desired.

A grille 36 for the support of food 38 to be charbroiled is directly supported on the upper faces of the upwardly extending enclosure walls 26,26 and 28,28. For clarity of illustration, food 38 is shown only in FIG. 2 of the drawings. The grille, as best seen in FIG. 1, comprises a bent rod that includes a handle 40A, oppositely extending arms 40B,40B, and spaced parallel extending arm 40C,40C that are adapted to extend along opposite walls 28,28 outside the enclosure. Upwardly extending brackets 42,42 are attached as by welding to parallel arms 40C,40C. The grille includes parallel food-supporting rods 44 that are welded to a central longitudinally extending rod 46. The opposite ends of rods 44 extend through apertures formed along the brackets 42,42. Rods 44A,44A at opposite ends of the array of parallel rods are affixed as by welding to arms 40C,40C. Rods 44 between the end rods, on the other hand, are free for axial movement within the apertures in bracket 42,42 to allow for expansion and contraction thereof during heating and cooling to minimize warping of the grille during use with high temperature fires. The ends of central longitudinally extending rod 46 rest on end walls 26,26 when the grille is positioned on the enclosure walls to control sagging of rods 44 when charbroiling.

A cover 48 having a handle, or grip, 50 is provided which may be placed directly upon grille 36 for use in standby operation of the charbroiler, or may be placed directly on top of the enclosure walls 26,26 and 28,28 for use in extinguishing the fire when grille 36 is removed therefrom. With the cover supported on the grille, the rate of flow of flue gases from the enclosure is limited during standby operation. The standby mode of operation is described in greater detail following a description of the remainder of the charbroiler.

A grate 52 is positioned inside the enclosure adjacent the bottom member 24 for dividing the enclosure into upper and lower chambers 54U and 54L, respectively, identified in FIG. 3. Grate 52 simply may comprise a series of rods 56 extending between opposite walls 28,28, which walls may be provided with a series of holes into which the ends of the rods extend for the support thereof. The upper chamber 54U comprises a depot for lump carbonaceous fuel 58, shown in FIG. 2, such as chunks of anthracite, briquettes including charcoal briquettes, or the like. Bottom chamber 54L comprises an air preheating manifold where ambient air entering the enclosure through inlets 30 is preheated by the burning fuel. The grate 52 and grille 36 preferably are made of corrosion-resistant refractory alloy metal and/or refractory ceramic material to withstand the high temperatures generated during combustion of fuel contained in the enclosure. Side walls 26,26 and 28,28 may simply rest on base member 24 or may be connected thereto by any suitable means not shown. Obviously, other grates, such as one supported by legs on bottom member 24 of the enclosure may be employed in place of rods 56 supported by opposite enclosure walls, if desired.

Figure 4:
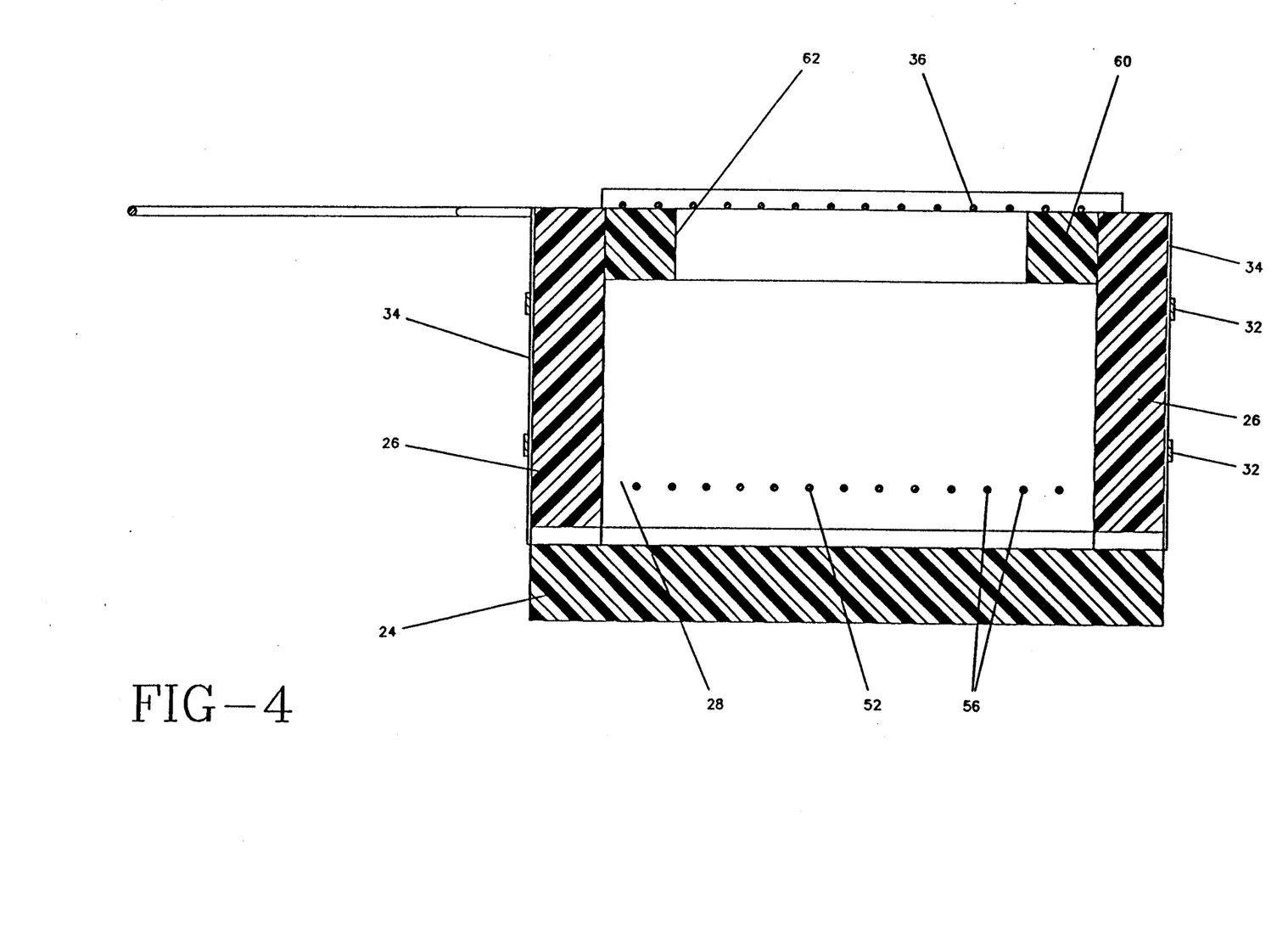
FIG. 4 is a vertical sectional view similar to that of FIG. 2 but showing a modified form of this invention which includes a top having an outlet port formed therein for the exit of flue gases.
Figure 5:
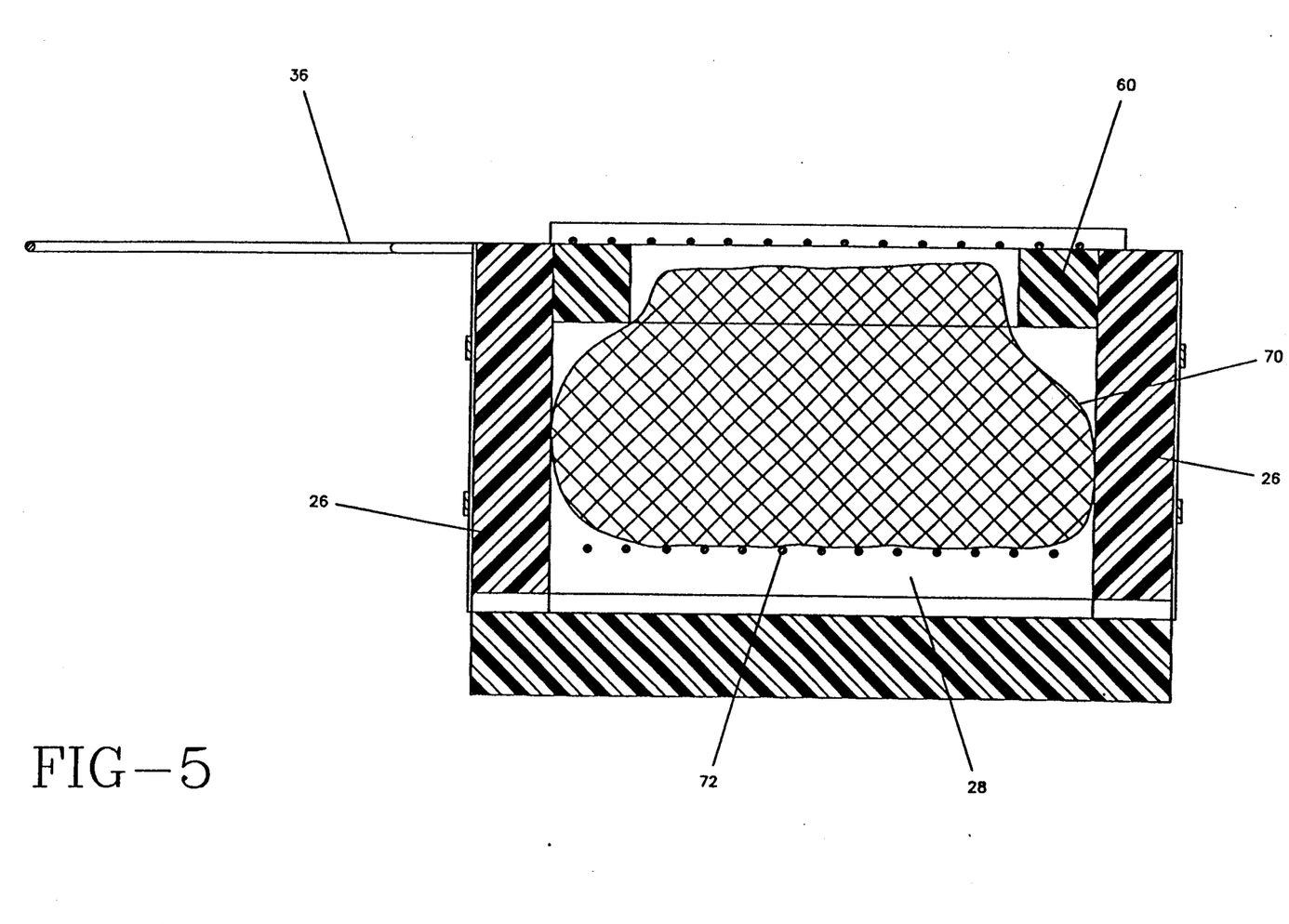
FIG. 5 is a vertical sectional view similar to that of FIGS. 2 and 4 and showing another modified form of this invention which includes a net bag for containing the carbonaceous fuel within the charbroiler.

The enclosure of the present invention is of relatively small size. For example, for home use an enclosure with length L, width W, and height H dimensions on the order of L=7", W=6" and H=6" may be employed. With this size enclosure, the broiler illustrated in FIGS. 1-3 is provided with a $6'' \times 7'' = 42$ in$^2$ outlet at the upper end thereof. A larger enclosure on the order of L=9", W=8" and H=6" which holds much more fuel is well adapted for restaurant use, and such an enclosure is shown in FIGS. 4 and 5 described herein below.

In preparation for use of the charbroiler the upper chamber of the enclosure is loaded with lump fuel through the outlet at the top thereof to provide for a stack of fuel 58 that is supported by grate 52 at the bottom thereof and is contained by the upright walls of the enclosure at all sides thereof. The enclosure may be substantially filled with lump fuel as shown in FIG. 2. Fuel loaded in the enclosure is ignited as by an electric starter inserted into the manifold 54L beneath the grate through an air inlet port 30, or by directing the flame of a propane torch through the inlet port. No blower, chimney, chemical starter fluid, or the like, is required to accelerate combustion.

The broiler of this invention operates at a high temperature which provides for a high radiant energy output needed for charbroiling, without roasting. High temperature operation, in the order of 1800° F. to 2200° F., is provided by heat feedback from the base and walls of the refractory insulating material. As noted above, the refractory ceramic fiber (RCF) material of which the enclosure is constructed is a very good heat insulator whereby only a small amount of heat passes therethrough from the hot coals. Consequently, the interior surfaces of the enclosure become very hot during use and radiate heat back to burning coals. As a result of such heat feedback, the coals burn at a substantially higher temperature than, say a pile of burning fuel not so enclosed by refractory ceramic fiber insulating material. For example, an enclosure of steel would not provide for such high temperature operation because of the large heat loss by conduction through such an enclosure.

Heat loss by direct radiation from the burning fuel through the air inlets 30 is minimized by extending the inlets around substantially the entire periphery of the upright walls while minimizing the height thereof. For example, with the above-mentioned enclosure dimensions, air inlets 30 with a height of no greater than ¼" are required to provide the fuel with sufficient air for rapid combustion of, say, 2 to 3 pounds of lump carbonaceous fuel contained therein. The air inlets 30 may range in height between, say, 3/16 and ⅜ inches. With the cover removed, some air also enters the enclosure through the outlet at the top of enclosure.

Carbon monoxide (CO) produced by the burning carbonaceous fuel mixes with air and, if the CO and air mixture is greater than about 1200° F., the CO self-ignite and pale flames of burning CO are seen above the bed of burning coals. Conventional grills often operate at about 1200° F. such that at times CO flares up, and at other times there is no ignition and great clouds of smoke are emitted. With the present invention, which operates in the range of 1800° F. to 2200° F. during broiling, the CO burns continuously to ignite and consume smoke and maintain a high flue gas temperature.

As is well understood, the rate of chemical reactions is dependent upon temperature. Thus, the heat output of a carbon fire can be increased by heating the carbon coals and the air that enters the fire. One might expect that with a stoichiometric supply of oxygen, the temperature of coals in an open-air carbon fire would increase explosively and rise to a peak limited only by the rate at which oxygen molecules can diffuse into the coals. However, observation shows that this is not the case. In conventional charcoal grills or open-air fires the flue gases typically have temperatures close to 1200° F. The temperature gradually falls as the coals are consumed.

An explanation for the low temperature provided by conventional briquette and charcoal grill fires is found in the Stefan-Boltzmann Law which shows that hot bodies such as burning coals lose heat by radiation and that the amount of loss is proportional to the fourth power of their absolute temperature. Thus, a single coal burning at 2000° F. in open air loses about eight times as much energy through radiation and about twice as much heat through conduction as a similar coal burning at 1000° F., it being understood that conductive losses are proportional to the difference between the hot body temperature and the temperature of the surrounding air.

As an example, when a burning coal is moved from a firebed of burning coals into open space, it may lose heat at a faster rate than the rate at which heat is generated by combustion. When this occurs, the coal cools until it reaches a stable temperature at which the heat generated by its combustion is equal to the rate at which heat is lost through radiation to space and conduction to surrounding air. That temperature at which the heat generated equals heat loss is a stable state which here is called the coal's "stable temperature". In the case of isolated pieces of charcoal or briquettes burning in ambient air, their stable combustion temperature may be 1000° F. or less. In hot air they burn well; in cold air they may self-extinguish.

In the case of a burning anthracite coal, whether moved into a 500° F. oven or into room temperature air, the rate of heat generation by combustion is far less than its rate of heat loss through conduction to surrounding air and radiation to space. Consequently, hot anthracite coals will not continue to burn in open space. Also, anthracite will not burn in conventional open charcoal grills to which cool input air is supplied and which provide easy escape of radiant energy and easy conduction of heat to surrounding air. The novel charbroiler of the present invention which preheats air for combustion and which minimizes heat loss by both conduction and radiation is capable of burning lump anthracite fuel.

The temperature and heat output from a firebox charcoal grill is dependent upon the geometry of the coal bed. The stable temperature of each coal in a bed of coals and its rate of heat loss depends upon the environment surrounding the coal. For example, when two layers of briquettes are burned in a charcoal grill, coals in the upper layer lose heat by radiation into space above the coals, and those in the lower layer lose heat by radiation to the grill pan below the bed. The Stefan-Boltzmann Law shows that when two equally hot bodies face each other the net radiation from one to the other is zero. Thus, radiant energy will be conserved in the area between two burning coals. From this, it will be apparent that coals in a two-layer, or greater, bed burn hotter than coals in a single-layer bed.

Similar consideration of fire beds having three or more layers of coals shows that the highest coal temperatures will be found in these coals deep within the fire bed, lower temperatures will be found in coals nearer the boundaries of the bed, and those coals which are actually on an uninsulated boundary of the bed will burn at the lowest temperatures. Comparing various possible bed geometries, each of which contains the same volume of coals, the greatest heat output is expected from beds which have the least peripheral surface area and hence have the least heat loss through radiation. With the present invention, as best illustrated in FIG. 2, the coal bed completely covers the grate and includes a plurality of layers of chunks of fuel, the number of layers being dependent upon the fuel size. The coal bed, which preferably includes at least three layers of coals, has generally vertical boundaries defined by the inside surfaces of the enclosure walls, and bottom and top boundaries of a size determined, essentially, by the horizontal dimensions of the enclosure. With enclosure dimensions mentioned above, the height exceeds ½ that of the largest horizontal dimension. The resultant stack of fuel 44 is capable of burning at a high temperature and with a high heat output.

To maximize the speed of fuel combustion, the stable temperature of the coals must be maximized, and to this end most of the coals must be surrounded by equally hot radiating surfaces. With the present invention, this goal is closely approached by surrounding the coal bed stack with refractory heat insulating material. Coals which abut the insulating enclosure walls 26 and 28 heat the interior wall surfaces to a temperature almost as high as that of the coals. When this occurs, the interior wall surfaces serve as reflectors and re-radiate most of the heat emitted from the coals back toward the coals. The net loss of radiant energy through the insulating walls is minuscule compared, for example, to the energy loss through openings to ambient air or through uninsulated metal firebed walls. Also, the insulating base member 24 adjacent grate 52 serves to reflect much of the heat from coals at the base of the fire back to the fire bed. The average stable temperature of a group of coals in a bed enclosed by insulation, such as in the present invention, is much higher than that of coals not so enclosed and so long as all coals have access to oxygen, fires in deep beds will burn carbon fuel more rapidly and yield more heat than those in shallow beds.

As described above, and seen in the drawings, the aperture in the insulating enclosure for the exit of flue gases serves as the output port for both flue gases and radiant energy needed for fast food charring. For maximum heat output per square inch of aperture, the flue gas port in the insulating enclosure should be no larger than necessary to allow for unobstructed exit of flue gases. With the present invention which includes substantially vertical side walls, the flue gas outlet is no larger than the footprint of the chunks of fuel 44 stacked within the enclosure. Most conventional charcoal grills are not designed for high heat output; their walls are not insulated, the coals typically are spread out to form a broad, shallow bed, and the opening above the bed is often many times larger than necessary for free flow of flue gases.

As mentioned above, cover 48 is used during standby operation when there is no demand for charred food. With the cover in place the rate of fuel consumption, and hence the rate of heat output, is reduced while maintaining the coals at a high temperature. In this way, the fire is kept hot and ready for use when desired or needed. With the cover in place above the grille 36, the loss of radiant energy through the flue gas outlet port means is minimized by minimizing the line-of-sight paths for exit of radiant energy from the coal bed to space outside the enclosure. Such radiant energy loss is minimized by positioning cover 48 a short distance above the enclosure on grille 36. With the cover in place, the flue gas outlet port means is in the form of elongated horizontal slots formed between the cover 48 and the upper edge of the enclosure side walls 26 and 28. Also, as described above, radiant energy loss through the air inlets 30 is minimized by minimizing the line-of-sight paths for exit of such energy from the fuel bed to space outside the enclosure through the inlets. This is accomplished by minimizing the height of the air inlets while still providing adequate air for combustion. Consequently, radiant energy loss from the fuel bed at both the top and bottom thereof is minimized when the cover is in position on the grille. By locating cover 48 a short distance above the enclosure walls flue gases are allowed to escape from the burning fuel. The height of the horizontally oriented apertures between the enclosure walls and cover 48 for standby operation is dependent upon enclosure size, and is readily determined experimentally. For example, for an enclosure adapted to contain about 2.5-3 pounds of fuel, an aperture height of approximately one eighth of an inch has been found to be desirable, which aperture height is approximately ½ that of inlet apertures 30. If the exit apertures are too large the fire will burn too fast and the maximum standby period is shortened. If the exit apertures are too small air flow will be reduced, the fire's stable temperature will be low, and more time will be required for the fire to recover to a high operating temperature after the cover is removed. Using a charbroiler embodying the present invention, a fire that would normally yield an output greater than 120 watts per square inch for about 30 minutes, will burn in the standby mode for about two hours at a temperature of approximately 1600° F.

When it is desired to exit the standby mode and resume grilling, the cover is removed whereupon the flue gases flow freely upwardly under natural convection, and air moves more rapidly into inlet ports 30. The coals then burn at a higher rate and yield the high heat output needed for charring.

It here will be noted that a charbroiler with the above-mentioned dimensions of $L=7''$, $W=6''$ and $H=6''$, and having ¼" high inlet apertures has been built and tested. When filled with approximately 2.5 pounds of charcoal or charcoal briquettes, it yields a power output of at least 120 watts/in$^2$ for approximately 25 minutes making it well adapted for home use.

Reference now is made to FIG. 4 of the drawings wherein a modified form of this invention is shown which is similar to that shown in FIGS. 1-3 described above. However, in the FIG. 4 arrangement a partial top wall, or member, 60 is provided adjacent the upper edge of the upright walls of the enclosure which top member includes an aperture 62 for escape of flue gases. Top member 60 is formed of rigid refractory insulating ceramic material as are the side walls and bottom of the enclosure. Top member 60 functions to reduce radiation losses by reflecting some of the upwardly directed radiant energy back to the fire bed. The use of such a top, or partial cover, helps to get anthracite fuel up to high output power on the order 130 watts/in². As with the arrangement of FIGS. 1-3, air inlet apertures 30 at the bottoms of the vertical walls with a height within the range of approximately 3/16" to ⅜" provide the fuel with air for burning. The grate 52 and grille 36 may be of the same type shown in FIGS. 1-3 and described above. An enclosure of the type shown in FIG. 4 with an interior length of 9", width of 8" and height of 6" and with a top member 60 having a 6"×7" aperture therethrough has been built and tested. It holds about 10 pounds of anthracite lumps, and delivers at least 130 watts/in² for four hours, making it well adapted for restaurant use.

Reference now is made to FIG. 5 of the drawings wherein another modified form of this invention is shown. In FIG. 5, an enclosure is shown comprising bottom 24, side walls 26,26 end walls 28,28 and top 60, all of the type shown in FIG. 4. In this embodiment, lump carbonaceous fuel is contained in a coarse mesh net bag, or sack, 70 made of ceramic fiber, or thread. A fiber such as "Nextel" by Minnesota Mining and Manufacturing Company may be used in the construction of the bag. The bag which may be formed as by weaving, is provided with, say, ¼ inch openings. In use, it is filled with carbonaceous fuel and lowered into the enclosure onto grate 72 in preparation for burning of the fuel. When finished charbroiling, the bag, containing ashes and coals which may still be hot, may be lifted from the enclosure and wet down to extinguish the coals. Later, the spent fuel may be dumped from the bag, and the bag rinsed in water in preparation for reuse. Many prior art grills are heavy and not easily dumped even when cool. With this invention, removal of ashes and hot coals is greatly simplified.

As noted above, with the present invention, carbonaceous fuel is burned at temperatures in the 1800° to 2200° F. range, which is much hotter than conventional grill fires in which fuel often is burned in the range 1000° F. to 1200° F. Coals burning in the low temperature range of 1000° F. to 1200° F. emit dark red visible radiant energy. Hotter coals, burning at a temperature of 1800° F., emit an orange-yellow light.

Following is a table showing the relationship of color to temperature.

| Color | °F. |
| --- | --- |
| Dark blood red, black red | 990 |
| Dark red, blood red, low red | 1050 |
| Dark cherry red | 1175 |
| Medium Cherry red | 1250 |
| Cherry, full red | 1375 |
| Light cherry, light red | 1550 |
| Orange | 1650 |
| Light orange | 1725 |
| Yellow | 1825 |
| Light yellow | 1975 |
| White | 2200 |

Figure 6:
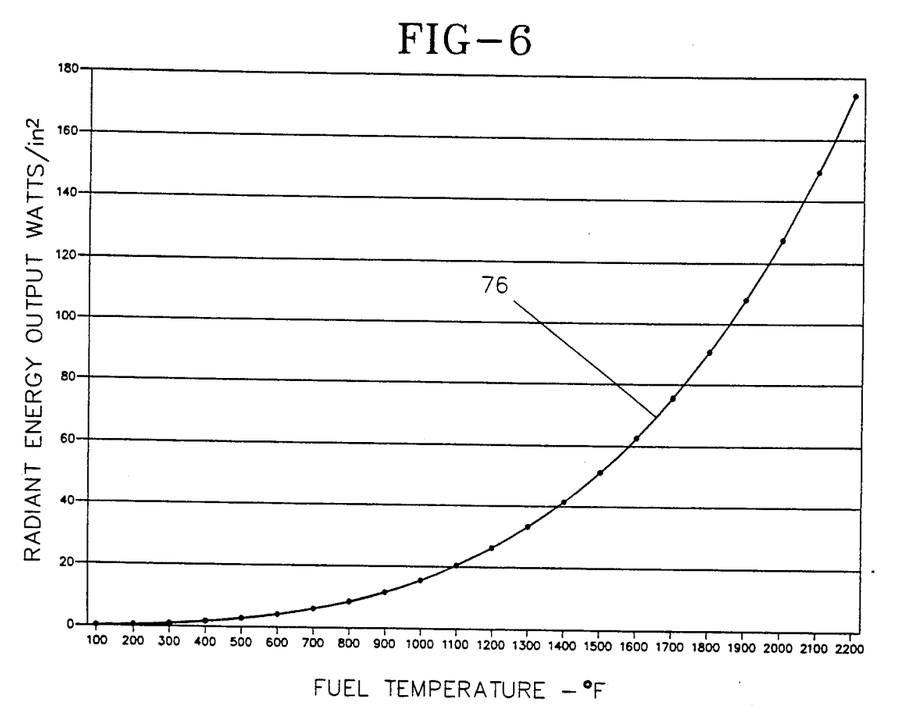
FIG. 6 is a graph showing radiant energy output versus fuel temperature for a charbroiler embodying the present invention.

The significance of operating at the higher temperature range of between 1800° F. and 2200° F. will be better understood from an examination of FIG. 6 which is a graph of radiant energy output versus fuel temperature. The graph is based upon calculation of radiant energy output using the formula:

$$q = 0.173 A (T/100)^4 \quad (1)$$

where:
q is the rate of heat output in BTU/ft²-hour,

T is absolute temperature in degrees Rankine,
A is area in ft², and
0.173 is the Stefan-Boltzmann constant.

Dividing the result q by 491 converts the result to watts/in².

$$q/491 = \text{watts/in}^2 \quad (2)$$

In FIG. 6, a plot 76 of radiant energy output in watts/in² versus temperature in degrees Fahrenheit is shown for a surface with an emissivity of one.

As seen from equation (1), and as shown in FIG. 6, the rate of emission varies as the fourth power of temperature. At the conventional low temperature, substantially dark red, fire of 1100° F., the radiant energy output is approximately 20 watts/in². At 1800° F., the low end of the operating range of the present invention, the fire is substantially yellow in color, and the radiant energy output is approximately 95 watts/in². The 64% increase in temperature, in this example, provides for a 375% increase in radiant energy power. Raising of the flue gas temperature by 64% increases the gas output energy by 64%, there being only a straight line relationship between conducted heat energy and temperature The radiant energy output of approximately 95 watts/in² at 1800° F., combined with conduct energy at that temperature, results in a total power output from the charbroiler on the order of 130 watts/in². At 1100° F. the conventional grill provides a heat output on the order of 40 watts/in². As noted above, conventional grills that operate at 1100° F. roast food whereas charbroilers of the present invention operating at 1800° F. and above function to charbroil the food.

The invention having been described in detail in accordance with requirements of the Patent Statutes, other changes and modifications will suggest themselves to those skilled in this art, and it is intended that such changes and modifications shall fall within the spirit and scope of the invention defined in the appended claims.

I claim:

1. A portable charbroiler for burning relatively small quantities of lump carbonaceous fuel at temperatures in the range of 1800° F. to 2200° F. comprising, an enclosure of refractory ceramic thermally insulating material functional at temperatures exceeding 2200° F. comprising a bottom member and enclosed side walls extending upwardly from the bottom member, outlet port means at the upper end of the enclosure, a grate supported inside the enclosure adjacent said bottom member a parallel spaced distance therefrom and dividing the enclosure into upper and lower chambers, the upper chamber comprising a depot for the lump carbonaceous fuel and the lower chamber comprising an air preheating manifold for preheating air that provides oxygen for combustion of the lump carbonaceous fuel, air inlet passage means at the lower chamber of the enclosure for flow of ambient air into said manifold, the upper chamber containing said lump carbonaceous fuel adapted to be loaded therein through the outlet so that the fuel completely covers the grate and forms a stack comprising a plurality of layers of fuel the sides of which stack are supported by the enclosure side walls and which stack comprises a labyrinthine network of passageways for restricted flow of air therethrough from said lower chamber to said outlet port means, whereby during combustion of the fuel feedback of heat to the lump carbonaceous fuel from the insulating enclosure bottom member and side walls provides for rapid high temperature combustion of the fuel in a temperature range between substantially 1800° F. and 2200° F. and energy output greater than 100 watts/in$^2$ at said outlet port means, combustion of said stack of lump carbonaceous fuel producing carbon monoxide which self-ignites and continuously burns at a location above said stack, line-of-sight paths for exit of radiant energy from burning fuel through said air inlet passage means being minimized to minimize radiant energy loss through said air inlet passage means.

2. A portable charbroiler as defined in claim 1 wherein said air inlet passage means comprises a plurality of elongated horizontal slots formed between said bottom member and lower edge of the enclosure side walls.

3. A portable charbroiler as defined in claim 2 wherein said slots are between substantially 3/16 and ⅜ inches in height.

4. A portable charbroiler as defined in claim 3 wherein said slots extend substantially the entire length of said side walls.

5. A portable charbroiler as defined in claim 1 including a cover of thermally insulating material supported a spaced distance above said side walls and providing feedback of heat therefrom to the fuel during combustion of the fuel, said outlet port means being provided between said cover and the upper edge of the enclosure side walls.

6. A portable charbroiler as defined in claim 5 wherein the size of the outlet port means with the cover in place on the side walls is substantially smaller than that of the air inlet passage means for reducing air flow therethrough and reducing the rate of combustion of the fuel yet maintaining a high fuel temperature.

7. A portable charbroiler as defined in claim 5 including a grille supported on the enclosure side walls for supporting said cover.

8. A portable charbroiler as defined in claim 1 including a top member of thermally insulating material adjacent the upper edge of the side walls, said top member being provided with an aperture for escape of flue gases from the enclosure, said top member providing for feedback of heat therefrom to the fuel during combustion of the fuel.

9. A portable charbroiler for burning relatively small quantities of lump carbonaceous fuel at temperatures in the range of 1800° F. to 2200° F. comprising, an enclosure of thermally insulating material comprising a bottom member and enclosed side walls extending upwardly from the bottom member, outlet port means at the upper end of the enclosure, a grate supported inside the enclosure adjacent said bottom member a parallel spaced distance therefrom and dividing the enclosure into upper and lower chambers, the upper chamber comprising a depot for the lump carbonaceous fuel and the lower chamber comprising an air preheating manifold for preheating air that provides oxygen for combustion of the lump carbonaceous fuel, air inlet passage means at the lower chamber of the enclosure for flow of ambient air into said manifold, the upper chamber being adapted for containing the lump carbonaceous fuel loaded therein through the outlet so that the fuel completely covers the grate and forms a stack of fuel the sides of which stack are supported by the enclosure side walls, whereby during combustion of the fuel feedback of heat to the fuel from the insulating enclosure bottom member and side walls provides for rapid high temperature combustion of the fuel in a temperature range between substantially 1800° F. and 2200° F., and a net bag of ceramic fiber for containing the carbonaceous fuel loaded into the upper chamber of the enclosure, said bag with its contents being removable from the enclosure for facilitating removal of ashes and coals from the enclosure when finished using said charbroiler.

10. A portable charbroiler as defined in claim 1 wherein the thermally insulating material comprises refractory ceramic fiber insulating material.

11. A portable charbroiler as defined in claim 1 including a grille for support of food to be charbroiled adapted for support at the outlet port means.

12. A portable charbroiler as defined in claim 1 wherein said carbonaceous fuel comprises anthracite coal.

13. A method for providing a high temperature fire of lump carbonaceous fuel at temperatures in the 1800° F. to 2200° F. range for charbroiling or the like comprising, providing an enclosure having a bottom and upwardly extending side walls formed of refractory ceramic fiber insulating material functional at temperatures greater than 2200° F. and having an outlet port at the upper end of the enclosure for natural convection of flue gases and emission of upwardly directed radiant energy emitted from burning fuel in the enclosure, dividing the enclosure into upper and lower chambers by a fuel-supporting grate, providing air inlet means at the lower chamber of the enclosure for flow of ambient air into the enclosure, stacking a plurality of layers of lump carbonaceous fuel into the upper chamber through said outlet port onto the grate so that the stack completely covers the grate and is supported at all sides by the enclosure side walls such that a labyrinthine network of passageways is formed by the stack of lump carbonaceous fuel for restricted flow of air through the stack from the lower chamber to the outlet port, burning the stack of lump carbonaceous fuel contained in the enclosure whereby feedback of heat to the burning fuel from the insulating enclosure bottom and side walls provides for rapid high-temperature combustion of the fuel in a temperature range between substantially 1800° F. and 2200° F. and with a radiant energy output at said outlet port in excess of 100 watts/in$^2$, said burning including the production of carbon monoxide and continuous ignition thereof above the stack of fuel, minimizing line-of-sight paths for exit of radiant energy from burning fuel through said air inlet passage means provided at the lower chamber of the enclosure for minimizing radiant energy loss through said air inlet passage means.

14. A method as defined in claim 13 wherein substantially vertically extending side walls are provided.

15. A method as defined in claim 13 wherein the lump carbonaceous fuel is stacked to a level at least three layers deep.

16. A method as defined in claim 13 wherein the stack of lump carbonaceous fuel substantially fills the upper chamber of the enclosure before burning.

17. A method for providing a high temperature fire of lump carbonaceous fuel at temperatures in the 1800° F. to 2200° F. range for charbroiling or the like comprising, providing an enclosure having a bottom and upwardly extending side walls formed of refractory ceramic fiber insulating material and having an outlet port at the upper end of the enclosure for natural convection of flue gases and emission of upwardly directed radiant energy emitted from burning fuel in the enclosure, dividing the enclosure into upper and lower chambers by a fuel-supporting grate, providing air inlet means at the lower chamber of the enclosure for flow of ambient air into the enclosure, stacking lump carbonaceous fuel into the upper chamber through said outlet port onto the grate so that the stack completely covers the grate and is supported at all sides by the enclosure side walls, burning the stack of lump carbonaceous fuel contained in the enclosure whereby feedback of heat to the burning fuel from the insulating enclosure bottom and side walls provides for rapid high-temperature combustion of the fuel, said stacking step including loading the lump carbonaceous fuel into a net bag of ceramic fiber, and lowering the fuel-containing bag into the enclosure through the outlet port.

18. A method as defined in claim 13 including igniting the fuel through the air inlet means.

19. A method for providing a high temperature fire of lump carbonaceous fuel at temperatures in the 1800° F. to 2200° F. range for charbroiling or the like comprising, providing an enclosure having a bottom and upwardly extending side walls formed of refractory ceramic fiber insulating material functional at temperatures greater than 2200° F. and having an outlet port at the upper end of the enclosure for natural convection of flue gases and emission of upwardly directed radiant energy emitted from burning fuel in the enclosure, dividing the enclosure into upper and lower chambers by a fuel-supporting grate, providing air inlet means at the lower chamber of the enclosure for flow of ambient air into the enclosure, stacking lump carbonaceous fuel into the upper chamber through said outlet port onto the grate so that the stack completely covers the grate and is supported at all sides by the enclosure side walls, burning the stack of lump carbonaceous fuel contained in the enclosure whereby feedback of heat to the burning fuel from the insulating enclosure bottom and side walls provides for rapid high-temperature combustion of the fuel in a temperature range between substantially 1800° F. and 2200° F. and with a radiant energy output at said outlet port in excess of 100 watts/in$^2$, minimizing line-of-sight paths for exit of radiant energy from burning fuel through said air inlet passage means provided at the lower chamber of the enclosure for minimizing radiant energy loss through said air inlet passage means, providing a top of refractory ceramic fiber insulating material at the upper end of the enclosure side walls having an aperture therein comprising said outlet port, and providing a grill for support of food to be charbroiled which grill is adapted for support at said outlet port.

* * * * *